United States Patent Office 3,271,248
Patented Sept. 6, 1966

3,271,248
PHARMACEUTICAL COMPOSITIONS CONTAINING AMINE MERCAPTO-SUCCINATES
Jean A. Renault and Eugène L. Leroi, Paris, France, assignors to Societe Civile de Recherches et d'Applications Scientifiques, Seine, France, a French civil society
No Drawing. Filed July 17, 1961, Ser. No. 124,354
Claims priority, application Great Britain, July 25, 1960, 25,802/60
2 Claims. (Cl. 167—52)

This invention relates to novel compositions of matter having therapeutic utility, and comprising compounds of mercapto-succinic acid with nitrogenous bases.

Mercapto-succinic, or thiomalic acid, and the inorganic salts thereof, especially the alkaline and earth-alkaline metal salts thereof, have been described in the literature. On the other hand, as far as the applicants are aware no organic base salts, whether neutral or acidic, of mercapto-succinic acid have ever been prepared heretofore. One reason for this apparently is that the classical method of double decomposition as applied to the salts of thiomalic acid and amine chlorides, amine sulfates and other amine salts, is inoperative for the preparation of the thiomalates of nitrogenous bases. The same is true of methods involving a direct neutralization of the acid with the base or vice versa, when performed without special precautions. These difficulties encountered in the preparation of organic base salts of mercapto-succinic acid are apparently due to the labile character of the —SH grouping present in the molecule of said acid. In addition, no very strenuous efforts appear ever to have been exerted for the preparation of amine salts of mercapto-succinic acid, because the unexpected therapeutic properties and usefulness of these salts had not, previously, been revealed.

The applicants have discovered a method of producing reliably and with high yields, compounds consisting of one mole mercapto-succinic acid and one mole or two moles of an amine or of two different amines. Further the applicants have found that the resulting compounds have desirable medicinal properties, especially as general and local detoxicants. The compounds can be used in therapy in various forms, including aerosols, suppositories, liquid applications, injection, tablets, and the like. The invention further includes salts wherein one of the acidic functions of mercapto-succinic acid is neutralized with an inorganic base and the other with an amine, i.e. mixed thiomalates such as the mixed thiomalates of any of the elements Na, K, Ba, Ca, Ag, Bi, and the like, and an amine.

Broadly the compounds to which the invention relates can be represented by the following formulae:

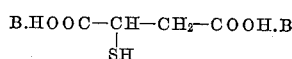 (1)

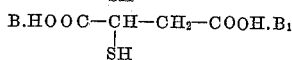 (2)

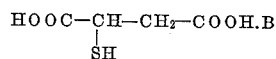 (3)

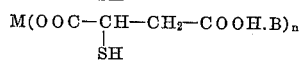 (4)

Formula 1 represents a neutral thiomalate in which B is a monovalent nitrogenous base. In the compounds of Formula 2 one of the acidic functions is combined with the monovalent nitrogenous base B and the other with the monovalent nitrogenous base $B_1$. Formula 3 represents the acidic salt while Formula 4 represents a mixed salt containing an inorganic cation M, having $n$ basic functions with a monovalent amine B. Polybasic amine salts are readily conceivable; for example where the organic amine is divalent, the formulae would be

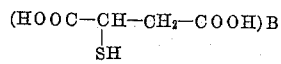

for the neutral salt, and

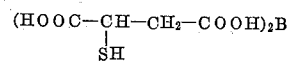

for the acidic salt.

For simplicity, the nitrogenous bases have been designated as B and $B_1$. It should be understood however that also usable according to the invention are aliphatic, alicyclic, cyclic and heterocyclic amines, including the primary, secondary and tertiary amines. Similarly, salts of quaternary nitrogenous bases are included in the scope of the invention. It should therefore be distinctly understood that the term "amine" as used in the specification and claims is to be interpreted in the broadest sense of this term consistent with chemical usage.

Preferably the compounds of the invention comprise salts of those amines which, per se, are known to possess some useful therapeutic function such as vasoconstrictor, broncho-dilator, antihistaminic, local anaesthetic, and similar actions. The cooperation of amines of this kind with the —SH function in the thiomalic acid is conductive to highly favourable therapeutic indices. Such salts possess interesting pharmacological properties both in view of the presence of the salifying acid, the —SH function of which imparts general and local detoxicating properties thereto, and in view of the presence of the base, which may have as stated a vaso-constrictor, broncho-dilator, anti-histaminic, local anaethetic, or other similar activity, whereby the novel compounds of this class may be used in both sub-acute and chronic disorders and in hyper-secretional conditions of the respiratory tract.

According to the invention, the method of preparing the novel compounds may comprise reacting thiomalic acid or an acidic salt thereof with one or more amines dissolved in a compatible solvent while taking steps to avoid temperature elevations both generally and locally.

The term compatible solvent as here used designates a solvent liquid that will not react with the amine or with the acid, and in particular, will not react with the —SH group bonded to a carbon of the acid. Suitable solvents will usually be found among the following: alcohols, ketones, ethers, esters, ether-alcohol mixtures, halogen-containing hydrocarbons, and the like. In some instances water constitutes a suitably compatible solvent.

Depending on the solubility of the reagents used, it may frequently be advisable to use the thiomalic acid in solution in a good solvent therefor, such as ethyl alcohol, while the amine may be dissolved in some other appropriate solvent, e.g. ether, ester, or the like, the two respective solvents being selected such as to be suitably miscible in the proportions used.

For preventing local and general temperature elevations in the medium during the mixing of the acid solution with the amine solution, one of the reagents should be introduced slowly and gradually into the other, with strong agitation, and the reaction should be continually monitored to see that there is no substantial temperature elevation at any time. The temperature of the reaction medium should, in fact, be kept as low as possible, preferably lower than 30° C.

Where it is desired to prepare an acidic salt, the amine dissolved in its appropriate solvent is introduced slowly and with agitation into an acid solution until a proportion of one mole amine per mole acid has been attained. This proportion of course applies to monoamines, i.e.

amines having a single nitrogen atom; the proportion should be reduced by half in the case of a diamine and so on.

In preparing neutral amine mercapto-succinates, on the other hand, according to the invention the acid solution should be poured into the amine solution to a proportion of two amine-nitrogens per acid molecule.

The details of procedure just mentioned are rather important since the amine salt generally forms progressively as the reagents are added and precipitates at once, at least in part. After the acid salt for example has precipitated, it becomes difficult thereafter to convert it in its crystalline phase into the corresponding neutral salt.

The salts of the invention may be recrystallized and purified by conventional techniques.

A few examples of the invention will now be described for purposes of illustration but not of limitation.

Example 1

75 grams mercapto-succinic acid were dissolved in a minimum of absolute ethyl alcohol, about 200 ml. Separately a solution containing 60.5 g. 1-phenyl, 2-amino ethane in 120 ml. ethyl ether was prepared. This second solution was gradually added to the first while adding the reaction mixture and cooling so as not to exceed 20° C. A viscous precipitate formed and set to a solid mass on standing. When separated from the mother liquor and recrystallized from absolute ethyl alcohol the precipitate had the composition of acidic 1-phenyl 2-amino ethane mercapto-succinate. Its melting point was 170–173° C. The yield was higher than 80%.

Example 2

To a solution containing 75 g. of mercapto-succinic acid identical with that in Example 1, there was slowly added, with agitation and cooling, 91.5 g. diphenylaminomethane dissolved in 120 ml. absolute ethyl alcohol. A salt immediately precipitated out. This precipitate was separated, washed with ethyl ether and recrystallized from absolute alcohol, and its composition was shown to be acidic diphenyl amino-methane mercapto-succinate; the melting point was 151–153° C. The yield of the process was higher than 80%.

Example 3

121 g. 1-phenyl 2-amino ethane were dissolved in 200 ml. absolute alcohol and there was then slowly added a solution containing 75 g. mercapto-succinic acid in about 200 ml. absolute alcohol. During the addition the reaction medium was stirred and cooled so as not to exceed 17° C. Part of the salt formed precipitated immediately during the process and was collected. The remaining alcohol solution was concentrated by distillation in vacuo of part of the solvent. On cooling a further portion of the salt crystallized out. The resulting product was purified by recrystallization and then had a melting point 155–156° C. The composition was that of neutral 1-phenyl 2-amino ethane mercapto-succinate.

Example 4

30 g. 1,2-diamino ethane were dissolved in a quantity of water just sufficient to produce a solution at about 70% concentration. Alternatively a corresponding quantity of the commercial aqueous solution can be used. There is slowly added to this solution, with agitation and cooling, a solution containing 75 grams mercapto-succinic acid dissolved in a minimum of water. The solution is concentrated by distillation in vacuo or in any other suitable way at a temperature of about 30° C., until crystallization sets in.

On cooling the salt crystallizes out. Drained and dried, it melts at 189–190° C. (with decomposition). It may be purified by recrystallization from water or washing with ethyl alcohol. Its composition is that of neutral 1,2-diamino ethane mercapto-succinate.

Example 5

121 grams 1-phenyl 1-amino ethane are dissolved in 200 ml. anhydrous ethyl ether. A solution containing 75 g. mercapto-succinic acid in 150 ml. absolute alcohol is then slowly added and throughout the addition the mixture is stirred and cooled so as not to exceed a temperature of 15° C. Part of the salt formed precipitates out during the addition and is recovered. The remaining ether-alcohol solution is concentrated by distilling part of the solvent in vacuo. On cooling a further portion of the salt crystallizes. The resulting product is purified by recrystallization from absolute alcohol. Its melting point is 139–140° C. and its composition is that of the neutral 1-phenyl 1-amino ethane mercapto-succinate.

Example 6

183 g. diphenylamino methane is dissolved in 500 ml. absolute ethyl alcohol. A solution containing 75 g. mercapto-succinic acid in about 150 ml. absolute alcohol is then added slowly. During that time the mixture is stirred and cooled so as not to exceed a temperature of 20° C. Part of the salt precipitates out immediately as the operation is in progress and is recovered. The remaining alcoholic solution is concentrated by distillation in vacuo of part of the solvent. On cooling, a further portion of the salt crystallizes out. The resulting product is purified by recrystallization and then has a melting point of 145° C. Its composition is that of the neutral diphenylaminomethane mercapto-succinate.

Example 7

33.30 g. acidic diphenylaminomethane mercapto-succinate were dissolved in 160 ml. absolute ethyl alcohol. 4.0 grams sodium hydroxide dissolved in 100 ml. absolute ethyl alcohol were then added slowly with strong agitation to prevent local over-heating. The salt forms and precipitated out during the operation. After standing several hours on ice, the mixture was drained and 70% of a salt were thus collected having an ill-determined melting point, but which was shown on analysis to be the mixed mercapto-succinate of sodium and diphenylaminomethane.

Example 8

By a procedure similar to that followed in Examples 1 to 4, the mercapto-succinates of the amines listed below can be prepared to provide novel compounds according to the invention. The list to be given is, however, in no way exhaustive.

1,2-diaminoethane:neutral salt, melting point (M.P.) 189–190° C. (dec.)

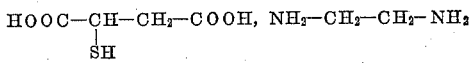

1,2-diaminoethane:acid salt, M.P. 194–196° C. (dec.)

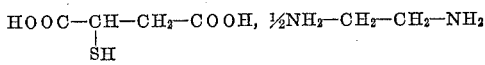

1-diethylamino-2-hydroxy-ethane:acid salt; highly hygroscopic

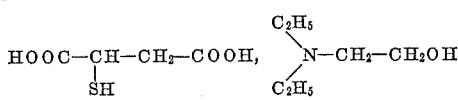

1-diethylamino-2-hydroxy-ethane:neutral salt, highly hygroscopic

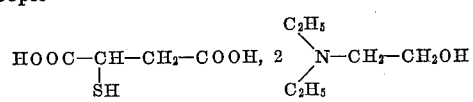

piperidine:acid salt, M.P. 115–117° C.

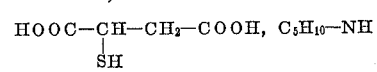

1-piperidino-2-hydroxy-ethane:acid salt, highly hygroscopic

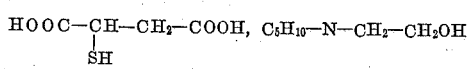

1-piperidino-2-hydroxy-ethane:neutral salt, highly hygroscopic

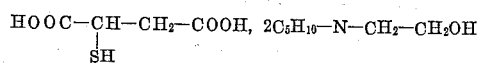

morpholine:acid salt, M.P. 128°–130° C.

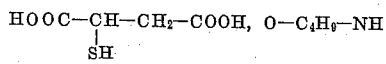

1-morpholino-2-hydroxy-ethane:acid salt, highly hygroscopic

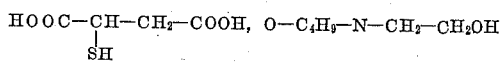

1-morpholino-2-hydroxy-ethane:neutral salt, highly hygroscopic

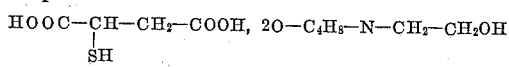

1-phenyl-2-amino-ethane:acid salt, M.P. 170–173° C.

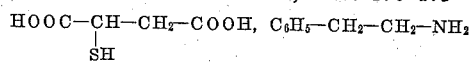

1-phenyl-2-amino-ethane:neutral salt, M.P. 155–156° C.

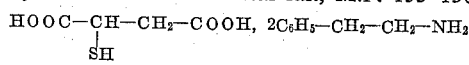

(d,l)-1-phenyl-1-amino-ethane:acid salt, highly hygroscopic

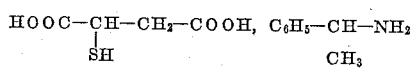

(d,l)-1-phenyl-1-amino-ethane:neutral salt, M.P. 139°–140° C.

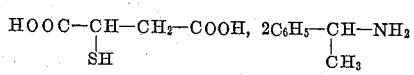

diphenylaminomethane:acid salt, M.P. 151–153° C.

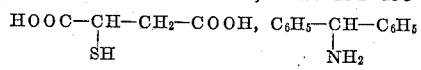

diphenylaminomethane:neutral salt, M.P. 145° C.

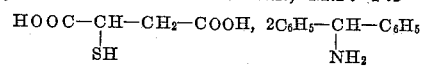

1-oxo-1-phenyl-2-piperidino-propane:acid salt, M.P. 108–110° C.

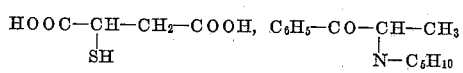

1-oxo-1-phenyl-2-methylaminopropane:acid salt, highly hygroscopic

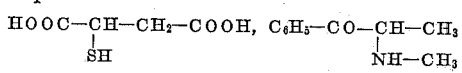

ephedrine:acid salt, M.P. 119°–120° C.

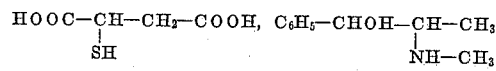

ephedrine:neutral salt, M.P. 157°–160° C. (dec.)

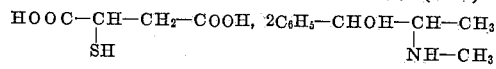

sodium and diphenylaminomethane

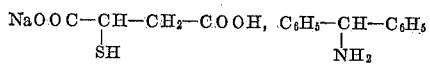

The novel compounds of the invention can be used as ingredients in a variety of pharmaceutical compositions, alone or in admixture with one another and/or other active ingredients. A few exemplary formulas that have been found useful are given below:

FORMULA 1

Orally ingestible tablets, pills and dragees can be prepared from the following formula and if desired may be coated with a coating resistent to attack by gastric juice:

|   | G. |
|---|---|
| Neutral, 1,2-diamino-ethane mercapto-succinate | 0.300 |
| Excipient (starch, lactose, gelatine, magnesium stearate or the like) q.s.p. | 0.400 |

The posology is from 2 to 5 tablets per diem.

FORMULA 2

Suppositories for rectal administration may be prepared from the following composition:

|   | G. |
|---|---|
| Neutral mercapto-succinate of 1,2-diamino-ethane | 0.300 |
| Cocoa butter, q.s.p. | 2.50 |

Posology: 2 to 5 suppositories per diem.

FORMULA 3

Another suitable composition for suppositories is:

|   | G. |
|---|---|
| Neutral mercapto-succinate of 1,2-diamino-ethane | 0.300 |
| Esters of saturated aliphatic acids, q.s.p. | 2.50 |

Posology: 1 to 2 suppositories per diem.

FORMULA 4

For administration in aerosol form, the following composition is suitable:

|   | G. |
|---|---|
| Neutral, 1,2-diamino-ethane mercapto-succinate | 0.300 |
| Neutral diphenylaminomethane mercapto-succinate | 0.025 |
| Neutral 1-(d,1) phenyl-1-amino ethane mercapto-succinate | 0.005 |

The solution may be prepared by extemporaneous dissolution in 5 ml. of an appropriate solvent such as one of the following:

(a)

| Distilled water | ml | 5 |
|---|---|---| or (b)

| Cetylpyridinium (wetting agent) | mg | 1.25 |
|---|---|---|
| Distilled water, q.s. | ml | 5 | or (c)

| Mixture of the hydrochlorides of dodecyl-di (aminoethyl) glycine and of tetradecyl-di (aminoethyl) glycine | mg | 0.1875 |
|---|---|---|
| Distilled water, q.s. | ml | 5 |

FORMULA 5

The following composition is suitable for administration as nasal instillation or spray:

|   | G. |
|---|---|
| 1,2-diamino ethane mercapto succinate | 1.200 |
| Neutral diphenylaminomethane mercapto succinate | 0.100 |
| Neutral 1-(d,l) phenyl 1-amino ethane mercapto-succinate | 0.020 | dissolved extemporaneously in an appropriate solvent such as:

(a)

| Distilled water | ml | 10 |
|---|---|---| or (b)

Carboxymethylcellulose _____g__ 0.100 to 0.150
Distilled water, q.s. _____ml__ 10 or (c)

Mixture of the hydrochlorides of dodecyl-di amino glycine and tetradecyl-di aminoethyl glycine _____g__ 0.5625
Distilled water, q.s. _____ml__ 5 or (d)

Mixture of the hydrochlorides of dodecyl-di aminoethyl glycine and tetradecyl-di aminoethyl glycine _____mg__ 0.5625
Carboxymethylcellulose _____g__ 0.100 to 0.150
Distilled water, q.s. _____ml__ 10
Posology: one or two sprays per diem.

The novel compositions of the invention have been subjected to various pharmacological tests, with the following results.

(A) *Neutral 1-(d,l) phenyl 1-amino ethane mercaptosuccinate.*—Tested for acute toxicity intraperitoneally, this compound was found to have a LD 50 value of 375 mg./kg. in the rabbit, 450 mg./kg. in the rat and 400 mg./kg. in the mouse. Subcutaneously, the LD 50 values were 500 mg./kg. in the rabbit and mouse and 600 mg./kg. in the rat.

Sub-acute toxicity was evaluated by treating the animals on four consecutive days and continuing the observations over the next five days. It was shown that intraperitoneally, doses of 250 mg./kg. in the rat and 200 mg./kg. in the rabbit and mouse are well tolerated. Subcutaneous injections of 300 mg./kg. doses are well tolerated by all three species of test animals.

The action on the palpebral, gingival and labial mucous membranes of the rabbit was investigated to determine local tolerance. For the palpebral membrane, two drops of the solutions to be tested were installed into the right eye of the rabbits and the eye was held open 30 seconds to ensure good diffusion of the solution. The other eye served as a control and received two drops of physiological solution. For the gingival and labial membranes, the solutions were applied by painting the membrane surfaces for 30 seconds. The animals were then examined one hour after treatment and next day before renewal of the treatment. In these conditions, and using a 5% solution in physiological solution for five days consecutively, no significant local reaction was observed.

A solution of the product given in aerosol form to guinea-pigs kept in the aerosol-filled cage for 30 minutes and one hour, provoked no sign of dyspnea.

In the isolated gut (ileum) of the guinea-pig and rabbit, a slight increase in the tonus of the smooth muscle was observed for a concentration of $10^{-4}$. After action of histamine, acetychloline and adrenaline, no significant activity was recorded.

A study of the action of the compounds on the motility of vibratile cilia of the oesophagus of the frog has shown that the compound, at a 1% concentration, causes only a slight reduction in such motility. A higher degree of inhibition is observed for a concentration of 5%.

Vasomotor activity, by contact, on the capillaries, at the level of the mesenteron in the rat and the guttural pouch in the hamster has shown, at a concentration of 1000 γ/ml., a vasoconstrictive action preceded by slight and transient vaso-dilatation. This action mostly involves the capillaries and only very rarely occurs at the level of the arterioles and veinules. At a concentration of 10,000 γ/ml., the reaction is more violent but of similar character.

(B) *Neutral diphenylamino - methane mercaptosuccinate.*—The acute toxicity LD 50 intraperitoneally is 150 mg./kg. in the rabbit, 300 mg./kg. in the rat and 200 mg./kg. in the mouse. Subcutaneously, LD 50 is 200 mg./kg. both in rabbit and mouse and 400 mg./kg. in the rat.

Sub-acute toxicity, evaluated as in the foregoing example, showed that doses of 100 mg./kg. in the rabbit, 125 mg./kg. in the mouse and 150 mg./kg. in the rat are well tolerated intraperitoneally. Subcutaneously, throughout the same period of treatment, doses of 200 mg./kg. were shown to be consistent with survival of the mouse.

5% solutions administered under similar conditions as in the foregoing example provoke no reactions in the palpebral, gingival and labial membranes of the rabbit.

In aerosol form, a solution of the product given to guinea-pigs kept in a special cage for 30 minutes and one hour cause no symptoms of dyspnea.

Investigation of the histaminic broncho-spasm in the guinea-pig (Halpern's method) shows that the product has bronchospasmolytic activity, the dwell line in the aerosol cage being doubled when using a 5% solution.

At this concentration, the compound has local anaesthetic action using Regnier's test on the rabbit's cornea.

On the isolated intestine (ileum) of the guinea-pig and rabbit, the compound at $10^{-4}$ concentration, induces a reduction and then a blocking of the spontaneous contractions of the intestinal fragment. After the tonus of the smooth muscle is reduced with adrenaline, the compound does not bring any notsubstantial alteration. After histamin and acetylcholine, it shows strong spasmolytic action, even at concentration as low as $10^{-5}$.

Its action on the vibratile ciliary motility of the frog oesophagus is more marked than that of the neutral mercapto-succinate of 1-(d,l) phenyl 1-amino ethane, and a definite retardation is observed at 1% concentration.

Contact vasomotor activity was investigated as described above on the capillaries of rat mesenteron and the guttural pouch of the hamster. The product at a concentration of 1000 γ/ml. induces capillary vasoconstriction accompanied by a reduction in the diameter of the arterioles. At a concentration of 10,000 γ/ml. the reaction is more rapid and accompanied by transient blood stasis. Such vasoconstriction is persistent, and may last as long as 2 minutes.

(C) *Neutral 1,2-diamino ethane mercaptosuccinate.*—LD 50, by intraperitoneal injection is 500 mg./kg. in the rabbit, 850 mg./kg. in the rat and 600 mg./kg. in the mouse. Percutaneously LD 50 is 1000 mg./kg. in the rat and 750 mg./kg. in the mouse.

Subacute toxicity determined as in the preceding examples shows that doses up to 650 mg./kg. in the rat and 450 mg./kg. in the rabbit and mouse are well tolerated intraperitoneally.

The local tolerance for 5% solutions, on the palpebral, gingival and labial mucous membranes in the rabbit is satisfactory. No significant local reaction is observed.

Prolonged dwelling (30 minutes and one hour) of guinea-pigs in aerosol-filled cages induces no symptoms of dyspnea.

Solutions of from 1 to 5% concentration have no significant action on the motility of vibratile cilia of the oesophagus of the frog. Thus black poppy seeds 0.4 mm. in diameter, deposited on a preparation of isolated frog oesophagus mucous membrane moistened with Locke's solution, progressed at a rate of 16.8 and 15.2 mm. per 100 seconds prior to treatment of the membrane. After the membrane fragment was washed with a 1% solution of the compound the rate was 17 mm. per 100 seconds; and when washed with a 5% solution the rate was 16 mm./100 seconds.

The compound was not found to possess any local anaesthetic, anti-histaminic or vaso-constrictive actions. It is primarily a vector for the —SH group.

A composition according to Formula 4 (c) given above was subjected to pharmacological tests with the following results:

Acute toxicity: Intra-peritoneally, LD 50=1200 mg./kg. in the rabbit, 1100 mg./kg. in the rat and mouse. Subcutaneously, LD 50=1200 mg./kg. in the rabbit, 1900 mg./kg. in the rat and 1375 mg./kg. in the mouse.

Sub-acute toxicity: Intraperitoneally, doses of 550 mg./kg. in the rabbit and rat, and 500 mg./kg. in the mouse were well tolerated over four consecutive days, the observations being continued over the five following days. Subcutaneously and under similar conditions, doses of 650 mg./kg. in the rabbit and 825 mg./kg. in the rat and mouse were found consistent with survival.

Chronic toxicity: Subcutaneous injection during fifteen consecutive days of 220 mg./kg. in the rat and 200 mg./kg. in the rabbit and mouse was well tolerated. All of the animals survived and behaviour remained normal, but the animals lost 10 % weight.

Toxicity on oral and nasal applications: Forced absorption of doses up to 300 times the therapeutic dose showed no evidence of toxic effects.

Concentrations corresponding to 200 times the therapeutic dose, instilled daily during four days into the nasal cavity were perfectly well tolerated without any apparent damage or irritation to the mucous membranes.

In sum, even after intraperitoneal injection, the LD 50 index is about 200 times higher than the doses advocated for clinical treatment where the composition is used by nasal instillation or as aerosols.

Subcutaneously, LD 50 was 250 times higher than the therapeutic doses and by nasal instillation, the LD 50 could not be ascertained since it was higher than the amounts that are practically administrable.

Tolerance to the composition given on four successive days intraperitoneally or subcutaneously was 100 and 150 times higher than the therapeutic dose, respectively.

Finally, intra-peritoneal administration for 15 consecutive days, of doses 35 and 40 times higher, in the rabbit and rat respectively, than the therapeutically advocated doses, has been found consistent with survival of the test animals. There is, therefore, a very wide margin of safety between the doses tolerated by the test animals and the doses therapeutically advocated for clinical use.

Local tolerance, as tested for the palpebral, gingival and labial mucous membranes in the rabbit, is very satisfactory. No significant local reaction is observed on application of the solution on five successive days. Administration in aerosol form to guinea-pigs, with dwell times of 30 minutes and 1 hour, is perfectly tolerated, no signs of dyspnea being manifest. Such administration imparts protection to the animals against histaminic spasm as evidenced by Halpern's test.

In the isolated gut (ileum) of the guinea-pig and rabbit, slight spasmolytic activity is observed at a concentration of $10^{-3}$, but the inhibition of spontaneous contractions is never complete.

Action on the motility of the vibratile cilia of the oesophagus of the frog is very slight. It is not perceptible at a concentration of 1% and remains very weak at the therapeutic concentration.

At the same concentration, slight local anaesthetic activity has been evidenced.

In regard to vaso-motricity as measured on capillaries at the level of the mesenteron of the rat and the guttural pouch of the hamster, definite vasoconstriction of the capillaries with a slight constriction of the arterioles is observed at a concentration of 10,000 γ/ml.

In brief, the compound mixture possesses slight anaesthetic, spasmolytic and bronchospasmolytic activity. It affords protection against histaminic bronchospasm. Vaso-constrictive activity is also noted. Its toxicity is very low and tolerance satisfactory.

Clinically, the compositions have been tested chiefly in connection with disorders of the upper respiratory tract, alone and in various mixtures.

Thus a composition identical with Formula 4 (c) above, already described in respect to pharmacology, was successfully used in aerosol form at the rate of one dose a day on 8 to 10 consecutive days in cases of catarrh of the cavum, muco-purulent rhinites, chronic and catarrhal laryngites, rhino-pharyngites, vasomotor rhinites, red angina, adenoidites, sinusites, acute seasonal bronchites, tracheites and the like.

In all instances the composition was very well tolerated and no incidents were noted in this connection. A few of the observed cases are described below:

Louise R., 67 years, catarrh of the cavum and chronic rhinitis of scabby character, in progress for two years, refractory to the earlier instituted sulfur treatments. Ten applications of aerosol were made. Tolerance was perfect. Functional effect: termination of cough and catarrh. Objective effect: a clean cavum. Excellent results.

Raoul P., catarrh of the cavum. Ten aerosols were applied. Perfect tolerance. Functional effect: marked improvement after four applications. Objective effect: near-complete disappearance of pharyngal secretion. Complete cure.

Maurice P., 59 years, chronic laryngitis with chronic rhinitis. Ten aerosol treatments were applied. Perfect tolerance. Functional effect: somewhat clearer voice. Objective effect: a clean larynx. The improvement persists after several weeks without therapy.

Helene L., 28 years, repetitive rhino-pharyngitis. Muco-pus in the nasal cavities and cavum. The patient complained chiefly of pharyngeal obstruction. Ten aerosol applications were made. Perfect tolerance. Functional effect: marked improvement. Objective effect: clean nose and cavum.

What we claim is:

1. A pharmaceutical composition having detoxicant properties comprising, as an essential ingredient therein, an effective amount of at least one neutral salt selected from the group consisting of the neutral mercapto-succinates of 1,2-diamino-ethane, of diphenyl-aminomethane, and of (d,l)-1-phenyl-1-amino-ethane together within an appropriate carrier.

2. A pharmaceutical composition having detoxicant properties comprising, as an essential ingredient therein, an effective amount of at least one member selected from the group consisting of the neutral and acid mercapto-succinates of -1-2-diaminoethane, of -1-diethylamino-2-hydroxy-ethane, of -1-phenyl-2-amino-ethane, of -(d,l)-1-phenyl-1-amino-ethane, of diphenyl-aminomethane, of -1-oxo-1-phenyl-2-methylamino-propane, and ephedrine, together with an appropriate carrier.

References Cited by the Examiner

UNITED STATES PATENTS

| 2,719,814 | 10/1955 | Haefele | 167—87.1 |
| 2,847,351 | 8/1958 | Brown et al. | 167—87.1 |
| 2,965,541 | 12/1960 | Byrnes | 167—55 |
| 2,996,503 | 8/1961 | Sprague | 260—247.1 |
| 3,001,996 | 9/1961 | Mannheimer | 260—247.1 |
| 3,008,874 | 11/1961 | Feeney | 167—55 |
| 3,157,578 | 11/1964 | Zviak et al. | 167—87.1 |

FOREIGN PATENTS 810,355   3/1959   Great Britain.

OTHER REFERENCES

Chem. Abst., vol. 50, Subject Index, 1965, page 2381S.
Yu-I Lang, Chem. Abst., vol. 51, col. 14982, 1957.

LORRAINE A. WEINBERGER, *Primary Examiner.*

MORRIS O. WOLK, JOHN D. RANDOLPH,
*Examiners.*

S. ROSEN, J. TOVAR, B. EISEN, *Assistant Examiners.*